Nov. 2, 1965  F. BEERLI  3,215,152

DISHWASHING MACHINE HAVING IMPROVED SPRAY DEVICE

Filed Nov. 15, 1961  3 Sheets-Sheet 1

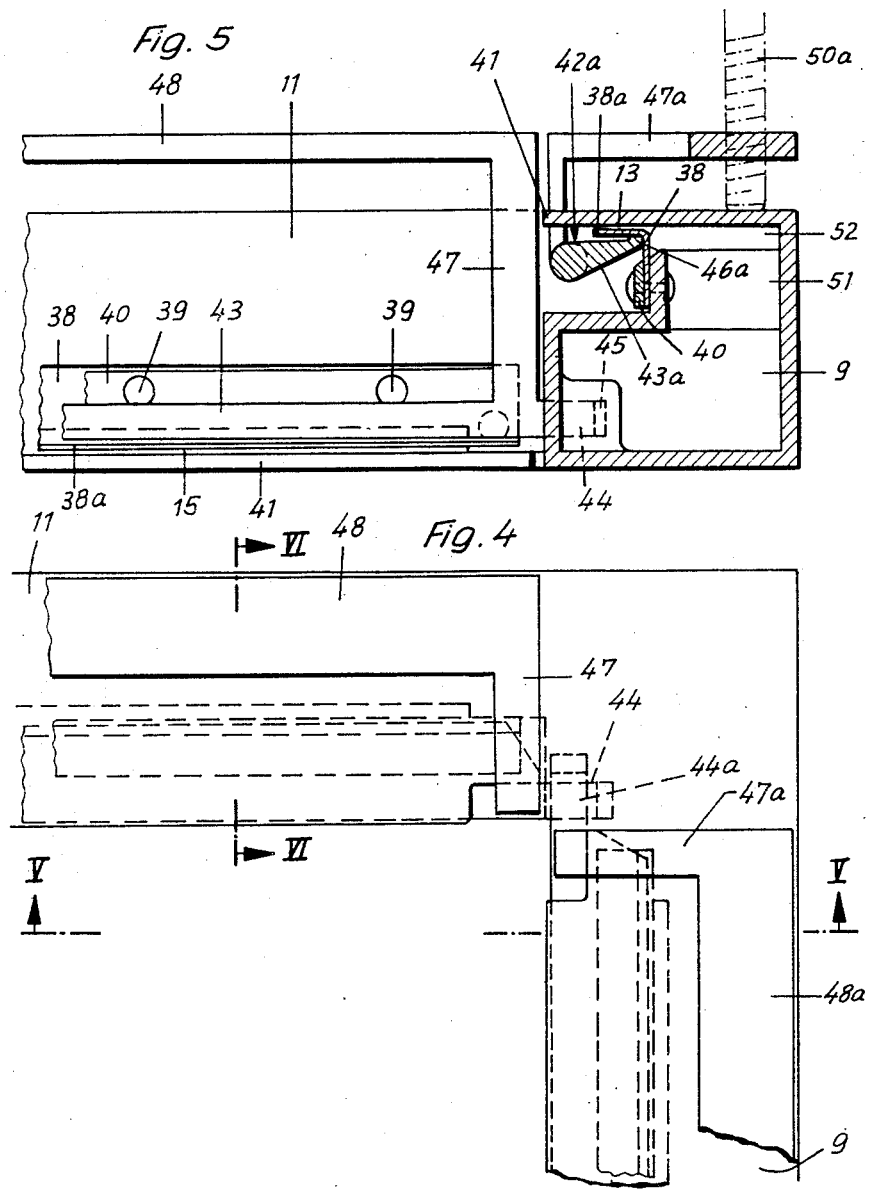

Nov. 2, 1965   F. BEERLI   3,215,152
DISHWASHING MACHINE HAVING IMPROVED SPRAY DEVICE
Filed Nov. 15, 1961   3 Sheets-Sheet 3
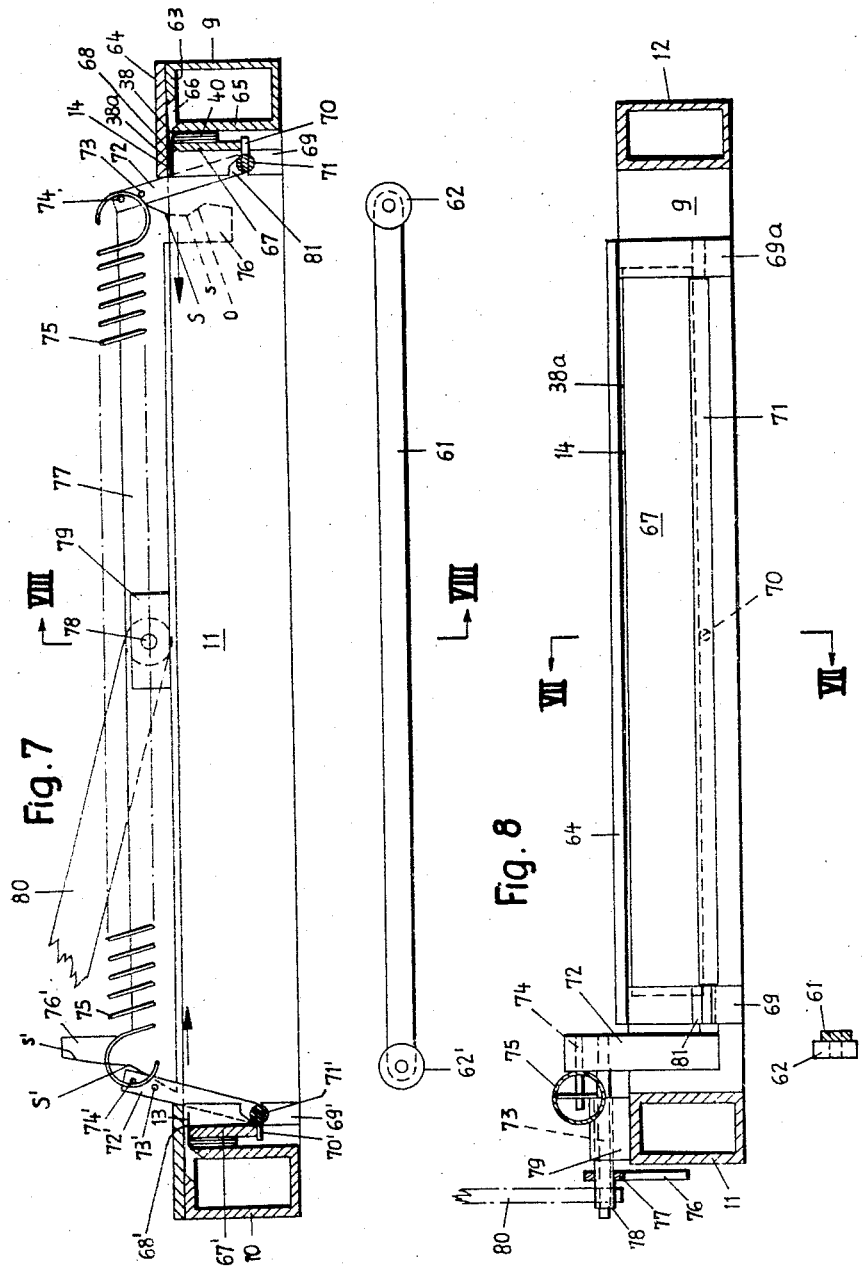

United States Patent Office 3,215,152
Patented Nov. 2, 1965

3,215,152
DISHWASHING MACHINE HAVING IMPROVED SPRAY DEVICE
Fridolin Beerli, 52 Rothfluhstrasse, Zollikon, Zurich, Switzerland
Filed Nov. 15, 1961, Ser. No. 152,459
Claims priority, application Switzerland, Nov. 18, 1960, 12,959/60
10 Claims. (Cl. 134—199)

The invention relates to improvements in washing machines for solid articles, such as dishes, pots and pans.

While the conventional household dish washing machines satisfactorily clean plates, glasses, cutlery, etc., they do not satisfactorily clean considerably encrusted frying pans, cooking pots, and the like. Heretofore, these articles had to be cleaned by hand which is an unpleasant and time consuming task.

The principal object of the invention is a machine for cleaning solid objects, particularly badly soiled kitchen ware, in which a spray device comprising at least one pair of conduits of rectangular section is arranged in opposed relation with respect to a carrier in which the articles to be washed and cleaned are placed and through which water under pressure can be fed. The conduits are provided with opposed right angle wall portions with at least one edge of one of the walls spaced from the other wall to form longitudinally extending outlet slots between the gaps thereof for directing flat, full sheet-like water jets onto the articles to be cleaned from opposite sides thereof. The outlet slots of said conduits are located in the same plane, and a resilient lip is connected to one of said right angle wall portions extending along one edge of each of said slots. The other of said right angle wall portions forms a flow directing plate extending along the other edge of said gap to provide a restricted spray orifice therebetween, and the free swinging edge portion of said resilient lip is arranged in spaced parallel relation to said last named right angle wall portion.

Two embodiments of the subject of the application are diagrammatically illustrated in the drawings, wherein:

FIG. 4 shows a plan view of a corner of the machine, drawn to a larger scale;

FIG. 5 shows a section along the line V—V of FIG 4;

FIG. 7 shows a section along the line VII—VII of FIG. 8 through a rectangular conduit frame, whereof two oppositely positioned conduits are formed with adjustable outlet gaps and, FIG. 8 shows a section along the line VIII—VIII of FIG. 7.

Figure 1:
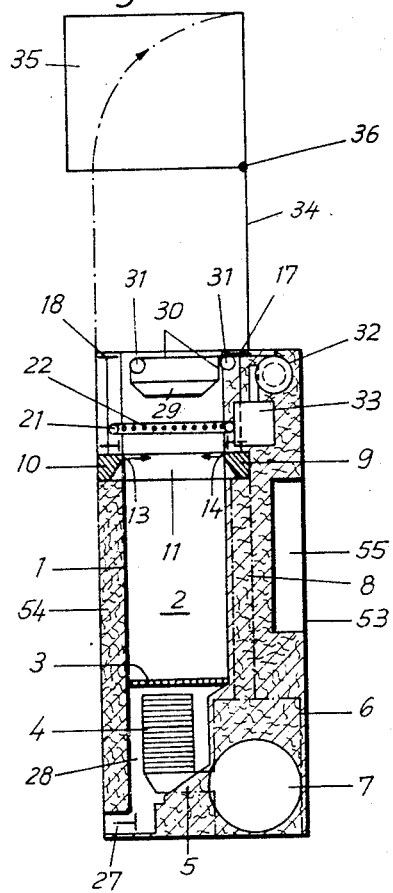
FIG. 1 shows a longitudinal section through a household machine for the cleaning of kitchen crockery or utensils, taken along the line I—I of FIG 3.

The crockery-washing machine illustrated in FIGS. 1–6 has an inner sheet-metal casing 1 forming a shaft-like upwardly open washing chamber 2 of rectangular cross-section. The washing chamber 2 is limited below by a removable coarse screen 3, arranged under which is a fine filter 4 of the gap-filter type, having for example gaps of only 0.1 mm. wide.

The fine filter 4 is connected, via a pipe 5, with the suction side of a pump 6 driven by an electric motor 7. From the pump 6, a pressure pipe 8 leads to a horizontal conduit 9 forming one longitudinal side of a horizontal rectangular conduit frame surrounding the washing chamber 2. The conduit 10 positioned opposite the conduit 9 is connected at its ends by the conduits 11 and 12 with the ends of the conduit 9.

Along the conduits 9 and 10, at the same height, extend two gaps 13 and 14 out of which the water emerges in the form of two oppositely-directed flat full jets, and enters into the washing chamber 2. Along the conduits 11 and 12, also at the same height but somewhat below the gaps 13 and 14, extend two gaps 15 and 16 out of which the water again emerges in the form of two oppositely directed flat full jets, entering into the washing chamber 2. The shape of the gaps 13 and 16 will be discussed in greater detail later; for the time being, it will merely be mentioned that the width of the gaps 13–16 is adjustable with the aid of hand wheels 19, 20. Above the duct frame 9–12 is a tubular frame 21 which also surrounds the washing chamber 2. The tubular frame 21 is formed on its inner side with a row of outlet apertures 22 and is connected with a water feed pipe 23 shown only in FIG. 2 and which, for its part, is connected via a mixing valve 24 with a cold water pipe 25 and a hot water pipe 26. By means of the pipe 23, clean water is continuously or intermittently supplied to the washing chamber 2, the temperature of the water being adjustable at the mixing valve 24. A corresponding quantity of water is removed from the washing chamber 2 through a relief valve 27 which is connected with the lower part of a filter chamber 28 surrounding the fine filter 4 and is preferably intermittently opened.

In the washing chamber 2 is a preferably grid or frame-like carrier bottom 29 which is suspended from four cables 30 guided via cable pulleys 31 to a cable drum 32. For the drive of the cable drum 32, there is an electric motor 33 which can be controlled in accordance with various programs, so as to move the carrier bottom 29, which is intended to receive a basket (not shown) for containing the crockery to be cleaned, up and down in the shaft-like washing chamber 2 to a selectable number of times, and where required also at selectable speed.

Above on the casing 1 is an upwardly extending wall 34 carrying pivotally attached at its upper end a closure hood 35 which is pivotal about a pivot 36. The hood 35 is shown in the upwardly-pivoted position in FIGS. 1 and 2. In FIG. 3, on the other hand, the hood 35 has been omitted, and so has also the conveying device 30–33.

Figure 6:
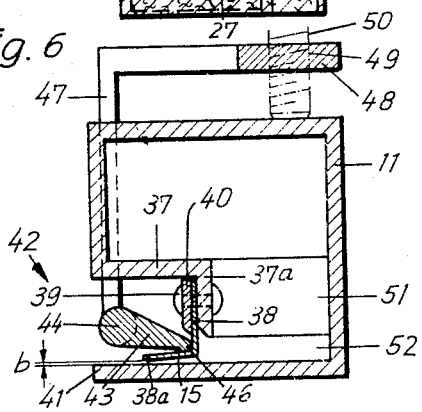
FIG. 6 shows a section along the line VI—VI of FIG 4.

The construction of the conduit 11 and of its gap 15 will now be discussed with reference to FIGS. 4–6. The conduit 11 has substantially square cross-section, but has an inwardly projecting wall 37 with a bent-over end portion 37a which does not extend as far as the lower conduit wall and to the outside of which a rubber strip 38 is secured by means of rivets 39 and a covering strip 40. The rubber strip 38 is bent-over and a limb thereof forms, below, a resilient lip 38a which limits the size of the gap 15 at the upper portion and imparts a nozzle-like profile thereto. The limb 38a extends approximately parallel to the lower wall of the conduit 11 which, externally of the gap nozzle 15, has a prolonging portion 41 and, together with the said prolonging portion 41, constitutes a plate serving for directing the flow passing through the gap 15.

The spacing between the bent-over end portion 37a of the wall 37 and the lower conduit wall can for example be 2–4 mm. The outlet-side width $b$ of the gap 15 is extremely small, for example only 0.1–0.3 mm. The width $b$ can be adjusted (or also entirely closed up) by means of an adjusting device generally designated 42, within a range of approximately 0.1–1.5 mm. The adjustment device 42 has an adjustment rod 43 parallel to the rubber strip 38 and tapering towards the said strip and being provided at its two ends with pins 44 pivotally mounted in bearings 45 (see FIG. 5). The edge 46 formed by the tapering profile is spaced furthest apart from the pivoting axis, defined by the pins 44, of the rod 43 and bears in the hollow throat of the bent-over rubber strip 38. Secured at the ends of the rod 43 are two bent-over arms 47 the ends of which are connected together by a flat bar 48 extending above the conduit 11. Provided in the centre of the flat bar 48 is a screwthreaded bore 49 in which engages a screwthreaded spindle 50 which bears below on the upper wall of the conduit 11 and is provided above, with the already-mentioned hand wheel 19 (see FIG. 3). It is obvious that, by rotating the hand wheel 19, the rod 43 can be pivoted and, due to the action of the edge 46 thereof on the rubber strip 38, the apertures in the gap nozzle 15 can be very exactly adjusted. From the bent-over end portion 37a of the wall 37, a plurality of baffles 51 extend to the opposite conduit wall. These baffles 51 (only one of which is shown in FIG. 5 of the drawings) are provided for reducing the longitudinally-directed water-velocity components near the gap 15, so that the water flows towards the said gap 15 and out of the said gap 15 as far as possible in the transverse direction of the conduit 11. In order that the baffles 51 may not themselves produce any kind of hindrance in the gap flow, a small, baffle-free chamber 52 is provided before the gap 15. The baffles 51 may be plane and directed perpendicularly relatively to the conduit axis; they may, however, also be blade-shaped, so as to branch off a flow directed towards the gap, as free as possible from eddies and impacts, from the flow which is substantially axially directed in the upper portion of the canal cross-section.

The conduit 12 and the gap 16 thereof are designed in the same manner as the conduit 11 and the gap 15 thereof. The conduits 9 and 10 differ from the conduits 11 and 12 only in that their gaps 13 or 14 are arranged in a plane above the gaps 15 and 16 (see right-hand side of FIG. 5). The adjustment device 42a for the width of the gap 13 (or 14) is designed in the same manner as the already-described adjustment device 42, in which connection only the bent-over arms 47a are somewhat shorter than the arms 47 and the screwthreaded spindle 50a has an oppositely-directed screwthread as compared with that of the spindle 50, in order that it may be necessary to rotate all the hand wheels 17–20 in the same direction, so as to open or close the gap nozzles 13–16.

Figure 2:
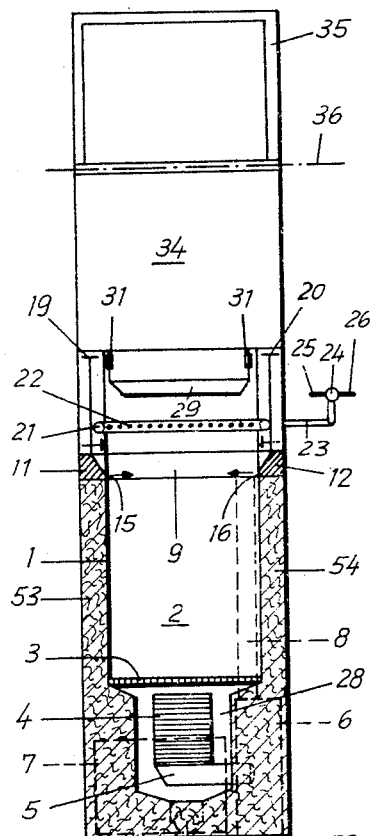
FIG 2 shows a longitudinal section along the line II—II of FIG. 3.
Figure 3:
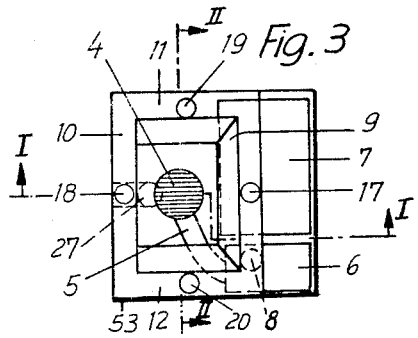
FIG. 3 shows a plan view in respect of FIG 1, after removal of some parts.

Reverting to FIGS. 1–3, it is further pointed out that the machine has an outer casing 53 serving as a jacket. The space between the casings 1 and 53 is filled with heat-insulating material 54 to the extent that it is not taken up for other purposes, for example for the motors 7 and 33 and a pump 6. In particular, within the jacket 53, there is a switch box 55 (see FIG. 1) which contains a time-signal transmitter, a relay, contact wheels and the like, i.e., all the electric apparatus necessary for programing control of the hoisting motor 33.

The machine described is operated in the following manner:

The crockery to be cleaned is laid in the crockery basket (not shown) and the latter is placed, with the hood 35 open, on the carrier bottom 29, whereafter the hood 35 is closed. Depending on the nature of the crockery and the degree to which it is soiled, a cleaning program is selected, for example by pressing the one or other of a plurality of keys (not shown) arranged preferably on the outer wall 53. Only two possible cleaning programs will be discussed by way of example hereinbelow:

(a) An exceedingly dirty and encrusted frying pan, which is laid individually in the crockery basket—the latter then being placed on the carrier bottom 29—is, after the pressing of a corresponding key, moved up and down or before the gap nozzles 13–16, in the washing chamber 2, six times during a passage of time of three minutes. The hot water emerging, for example under a pressure of 8 atmospheres excess pressure out of these gap nozzles 13–16 adjusted for example to a width of 0.2 mm., has an extremely intensive cleaning effect. The pressure exerted by the flat full jet out of the nozzle 13 on the pan is compensated by the pressure of the jet out of the nozzle 14; similarly, also the pressures of the jets out of the nozzles 15 and 16 are compensated for, so that the pan is not thrown on to the one side of the basket. The basket is furthermore designed in known manner and in accordance with the crockery to be cleaned, so that the latter may be securely retained.

When the carrier bottom 29 with the basket is moved upwardly for the last time, the movement slows down on passing the tubular frame 21, and out of the latter, through the apertures 22, entirely clean hot water is sprayed on the pan. Thereupon, the hood 35 is opened, the crockery basket is taken out and another crockery basket which has meanwhile been filled is inserted, whereupon the same program or another program can be selected.

(b) A plurality of cups, saucers and plates, which have been used for the partaking of breakfast, are laid together in a crockery basket intended especially for this purpose. In this case it is sufficient to move the carrier bottom 29 upwardly and downwardly twice and to provide a low water pressure of the pressure water supplied, this being adjustable for example with the aid of the hand wheels 17–20. The crockery can be laid down in the basket itself on a shelf or the like, and may dry in the air, until it is again put on the breakfast table. It is clear that the height of the washing water circulated by the pump 6 can be made higher or lower in the washing chamber 2, depending on the type of crockery involved, the extent to which it is soiled, the washing powders or wetting agents, etc., used. The relief valve 27 can be actuated by hand, for example in accordance with the observance of a water-level indicator; preferably, however, automatic actuation will be provided. In consequence of the fact that the washing water is again and again circulated by the pump 6, however, after extremely fine cleaning by the fine filter 4, and in consequence of the fact that an insulating means 54 is provided, the consumption of water and heat is extremely low. Due to the extremely thin, "knife-sharp" flat full jets acting at high speed, produced by means of the above-described, resilient gap nozzles, a very much more intensive cleaning effect is achieved as with the jets emerging from apertures, slots or rigid nozzles which immediately break up and form so-called "broom jets."

The resilient lip 38a and the flow-directing plate positioned opposite it have the effect, on the other hand, that, in the case of the present machine, what will emerge from the gaps 13–16 will be full jets, i.e., jets which do not tend to form empty intermediate spaces and thus to use their original form, i.e., the form which they had on emerging from the gap, but wherein the individual flow "threads" retain their connection one with another. The flat full jets emerging out of the gaps 13–16 act—apart from the breaking-up effect of the water—also in the same way as knives on the dirt adhering to the crockery to be cleaned, that is to say they so to speak "scrape off" the dirt.

Although, in the case of the cleaning machine described, use is preferably made of two pairs of oppositely directed gap nozzles extending perpendicularly relatively to each other, the number of gap-nozzle pairs can be varied to correspond with the specific material to be cleaned encountered for example in any particular kind of industry.

Also the conveying device for the material to be cleaned will be adapted to each specific case, and under certain circumstances it may be expedient to make the conduit with gap nozzle movable and, in place thereof, to arrange the material to be cleaned in such manner that it is stationary. Furthermore, it is possible to provide in the machine itself a preferably electrical heating device for heating the water.

In the constructional example according to FIGS. 7 and 8, what is concerned is again a dish washing machine, wherein the width of the gaps is adjustable. The machine is shown only to the extent as this is necessary for understanding the invention, the general construction thereof being the same in the case of the constructional example according to FIGS. 1-6.

What is provided is a rectangular conduit frame the conduits of which merge one into the other and form the frame sides, and are designated 9, 10, 11 and 12. The conduits 9 and 10 have outlet gaps 66 and 66'. The conduits 11 and 12 are shown without outlet gaps, so as not to unnecessarily overload the drawings, although these conduits are preferably also formed with outlet gaps.

A carrier bottom (not shown), upon which a basket containing the crockery to be cleaned is placed, is moved up and down in the conduit frame 9-12, in the manner already described, so that the crockery is acted upon and cleaned by the flat full jets (indicated by arrows) emerging from the gaps 13 and 14. Rigidly secured under the said carrier bottom and thereon is a bar 61, at the ends of which two control rollers 62 and 62' are pivotally arranged, for a purpose which will be discussed later.

Each of the gaps 13 and 14 is bounded on the one hand by a resilient lip 38a and one the other hand by a flow-directing plate which, in contradistinction to the earlier example, is formed by a plate 64 rigidly secured externally on a lateral wall 63 of the conduit 9 (or 10) instead of by a lateral wall itself and a prolonging portion thereof. The lip 38a is again formed by a bent-over limb of a strip 38 of elastomeric material, which is secured by means of a covering strip 40 and rivets (not shown) on the adjacent lateral wall 65 of the conduit 9 (or 10). The conduit profile is considerably simpler than in the earlier example, i.e., it is a purely rectangular profile without inwardly projecting walls, in which connection merely a considerable portion of the lateral wall 63 of the tube exhibiting this profile and an extremely small portion of the adjacent lateral wall 65 have been removed by an oblique milling cut 66. This constitutes, from the manufacturing point of view, a considerable saving in costs.

For the adjustment of the width of the gap 13 or 14, instead of a pivotal rod, there is provided a flat bar 67 formed with a unilaterally sharpened longitudinal edge 68 which engages and determines the position of the lip 38a. The flat bar 67 is guided in the vertical direction, on one side along its entire length, by the cover plate 40 and on the other side at its ends, by vertical bearing blocks 69 and 69a. The bar 67 bears, below and in its center on a thumb 70 projecting radially from a pivoting axis 71 extending parallel to the bar 67 and mounted at its slightly stepped ends in the bearing blocks 69 and 69a. It is apparent that, on upward pivoting of the thumb 70, the bar 67 will be displaced upwardly and will thereby diminish the size of the gap 14 (or 13), whereas, on downward pivoting of the thumb 70, due to the elasticity of the strip 38, it will follow the said thumb 70 and thereby increase the size of the gap 14 or 13. This elasticity also has the effect that the bar 67, which is supported only in the center, is always displaced parallel to itself, so that the width of the gap 14 (or 13) is constant along its whole length which, with actuation of the bar 67 at a plurality of points, can otherwise be achieved only by extremely accurate guiding means.

Rigidly secured at the left-hand end in Fig. 8 of the pivoting axis 71 is a lever 72 provided with a relatively long drive pin 73 and a relatively short spring securing pin 74. Secured on the latter is one and of a tension spring 75 the other end of which secured to a securing pin 74' provided on a lever 72'. The lever 72' extends symmetrically with respect to the lever 72 and serves for the actuation of gap-adjusting elements associated with the gap 13 and having the same reference numerals (with the addition of a "stroke") as the adjustment elements associated with the gap 14.

The drive pin 73 co-operates with a control cam 76 and the drive pin 73' with a control cam 76'. These two control cams 76 and 76' are provided at the opposite ends of a lever 77 secured to a pivot pin 78 in its center. The pin 78 is mounted on a bearing 79 disposed on the conduit frame 9-12 and carries an actuating handle 80. On pivoting the handle 80, the drive pins 73 and 73', which are retained by the spring 75 in contact with the effective portions (to be discussed in greater detail later) of the control cams 76 and 76', slide on these effective portions of the control cams 76 and 76', whereby pivoting of the pivots 71 and 71' and therewith also displacement of the flat bars 67 and 67' determining the gap width, is achieved.

In the position illustrated in Fig. 7, wherein the drive pins 73 and 73' bear against an effective portion of the control cams 76 and 76', the gaps 13 and 14 are opened to an equal extent by a small amount which, with the pressure obtaining in the conduit frame 9-12, results in the formation of a flat full jet. If the handle 80 is pivoted clockwise in Fig. 7, then, with the illustrated construction of the control cams 76 and 76', the pivot 71 is pivoted clockwise, whereas the pivot 71' is pivoted counterclockwise, so that both gaps 13 and 14 open, the width of the gaps 13 and 14 remaining equal to each other.

If the handle 80 is pivoted counterclockwise, the pivot 71 is pivoted counterclockwise and the pivot 71' is pivoted clockwise, through angles of equal size, so that the gaps 13 and 14 close simultaneously. If the drive pins 73 or 73' reach the points designated S or S' of the cams 76 and 76', the gaps 13 and 14 are closed. On further pivoting of the handle 80 in the counterclockwise direction, first of all nothing happens, since the following sections, designated s or s' of the control cams 76 and 76' are ineffective. These sections s and s' are, for example, circular with their center point in the axis of the lever pivot pin 78, but the radius of the circle is so small that the drive pins 73 and 73' are not able to bear against the sections s and s', since the flat bars 67, 67' cannot, after closing the gaps 14 and 13, be moved further upwardly and prevent further pivoting of the levers 72 and 72' inwardly. It is apparent that the control cams 76 and 76' may have any desired small radius in the ineffective section s and s'.

Upon further pivoting of the handle 80, however, the drive pin 73 finally runs up onto a portion o of the control cams 76, bringing about the opening of the gap 14, whereas at the same time the drive pin 73' is further located at a short distance from the section s' of the control cams 76', so that the gap 13 remains closed. In this position, then, a flat full jet corresponding to the entire delivery quantity of the pump is directed from only one side on to the article, for example a pan to be cleaned. Of course, this article must be sufficiently supported in the crockery basket and must be properly orientated, i.e., the pan to be cleaned must be directed towards the gap 14.

With the aid of the handle 80, the width of the gaps 13 and 14 can be extremely sensitively adjusted, so that the outflow quantity and pressure of the pressure water can in this way be regulated. The handle 80 can then be fixed in the set position with the aid of a clamping screw or the like (not shown). Where required, a detent device of known type can be associated also with the handle, the detent permitting for example opening of the gap by 1/10 in each case. Per se, furthermore, it will also be possible to provide detents on the control cams 76 and 76' themselves, but this is less practical.

The already-mentioned rollers 62 and 62' serve for opening the gaps 13 and 14 wide at least once during the cleaning process, thereby achieving the rinsing of the gaps, so that they cannot become stopped up. The carrier bottom (not shown) on which the bar 61 carrying the rollers 62 and 62' is secured, moves, at least at the end of the cleaning process, into an upper removing and supplying position, in which it is positioned above the conduit frame 9-12. Before the carrier bottom reaches this position, the rollers 62 and 62' impinge against the levers 72 and 72' and pivot them in the opening sense, in such manner that the gaps 13 and 14 are opened wide under the effect of the water pressure which presses the lips 38 and therewith the flat bars 67 and 67' downwardly. By means of this automatic cleaning of the gaps, it is unnecessary to provide an extremely fine screen, as in the preceding example.

In order to permit rapid assembly and disassembly of the parts 70 and 74 which are fast with each other, the bearing 69 is constructed as a laterally open bearing, so that the stepped end concerned of the pivot fast with the lever 72 can be inserted from the side through the bearing aperture designated 81 into the bearing 69, or can be removed from the same. The bearing 69a is closed, but exhibits a sufficient degree of play to permit the pushing-in or drawing-out of the appropriate end of the pivot 71, even in the case of a slight oblique positioning of the said pivot.

The main advantage of this mode of construction is that, for the disassembly of the pivot 71, the lever 72 does not require to be released therefrom. During reassembly, this would make exact adjustment of the angular position of the lever 72 relative to the pivot 71 necessary.

It should also be mentioned that, due to the securing of the springs 72 on the pins 74, a torque on the lever 72 about the drive pins 73 bearing against the control cam 76 is produced (in the anti-clockwise direction of FIG. 7) this torque tending to prevent undesirable lateral "jumping out" of the appropriate stepped end of the pivot out of the bearing 69. This advantageous effect is not achieved if the spring 75 is secured on the drive pins 73 themselves, although this would per se also be possible.

The adjustment of the gap width by displacement of the flat bar 67 (or 67') transversely of the gap is much more accurate than that achievable by means of the pivoting bar mentioned in the first example. Furthermore, the connection described of the adjustment devices for the two oppositely positioned gaps 13 and 14 with the common actuating handle 80 which opens and closes both gaps in the same direction in one portion of the adjustment zone but, in another portion of the said zone, allows one gap to be closed and opens the other, is very much more advantageous than the individual actuation of the adjustment devices disclosed in the first example.

What I claim is:

1. For use in a washing machine of the type described having an article carrier, a spray device comprising at least one pair of conduits of rectangular section arranged in opposed relation with respect to said carrier through which water under pressure can be fed, said conduits being provided with opposed right angle wall portions with at least one edge of one of the walls spaced from the other wall to form longitudinally extending outlet slots between the gaps thereof for directing flat, full sheet-like water jets onto the articles to be cleaned from opposite sides thereof, said outlet slots of said conduits being located in the same plane, a resilient lip connected to one of said right angle wall portions extending along one edge of each of said slots, the other of said right angle wall portions forming a flow directing plate extending along the other edge of said gap to provide a restricted spray orifice therebetween and the free swinging edge portion of said resilient lip being arranged in spaced parallel relation to said last named right angle wall portion.

2. For use in a washing machine of the type described, a spray device comprising at least one pair of conduits of rectangular section through which water under pressure can be fed, said conduits being provided with right angle wall portions at one of the corner portions thereof with one of the right angle wall portions having its edge spaced from the other right angle wall portion to provide a gap therebetween and form longitudinally extending continuous outlet slots arranged in opposed relation to project a full, flat sheet-like water jet on both sides of the articles to be cleaned, the slotted outlets of a conduit pair being located in the same plane to form oppositely directed flat jets located in said plane, a resilient lip connected to one of said right angle wall portions extending along one edge of said slot of each conduit pair, the other of said right angle wall portions forming a flow directing plate extending along the opposite edge of said slot, and a manually operable member engaging said resilient lip to move the same toward said flow directing plate and adjust the width of said slot, said resilient lip being arranged with its free edge in parallel spaced relation from said last named right angle wall portion.

3. For use in a washing machine of the type described having a carrier for articles, at least one pair of conduits through which water under pressure can be fed and which are formed of rectangular section with adjacent right angle wall portions, one edge of one of said right angle wall portions in spaced relation with the other right angle wall portion forming a gap to provide longitudinally extending continuous slotted outlet apertures arranged in opposed relation for directing a full, flat sheet-like water jet on both sides of the carrier, said outlet apertures of each conduit pair in opposed relation lying in the same plane to form a flat water jet also in said plane, a resilient lip connected to one of said right angle wall portions extending along one side of each of said slotted apertures, the other of said right angle wall portions providing a flow directing plate extending along the opposite edge of said slotted apertures, an elongated adjustable member engageable with said resilient lip for urging the free edge portion into engagement with said flow directing plate portion to adjust the width and thickness of the sheet-like spray jet, said resilient lip being formed of elastic material, and a longitudinally extending bar connected to said elongated adjustable member having its pivot axis extending longitudinally and parallel with said slotted outlet apertures to urge said resilient lip toward and away from said flow directing plate portion.

4. For use in a washing machine of the type described having an article carrier, a spray device comprising at least one pair of conduits of rectangular section arranged one on each side of said carrier through which water under pressure is adapted to be fed, each of said conduits being formed with adjacent right angle wall portions, with the edge of one of said wall portions spaced from the other wall portion to form a gap therebetween and provide longitudinally extending continuous outlet apertures located between said right angle wall portions and form oppositely directed slotted discharge openings through which water can be directed toward the articles to be cleaned from two sides thereof, the outlet apertures of said conduits being located in the same plane to form full, flat sheet-like water jets also located in said plane, a resilient lip connected to one of said right angle wall portions and extending along one edge of said slotted discharge opening, the other right angle wall forming a flow directing plate extending along the other edge of said slotted discharge opening with its free edge portion arranged in spaced relation from said discharge opening, an elongated longitudinally extending member pivotally mounted adjacent said resilient lip having a radially extending portion directly engaging the same throughout its length, an operating member adapted to move said radially extending portion into engagement with the free edge portion of said resilient lip to move the same into engagement with said last named right angle wall portion to control the discharge pathway between said lip and flow directing plate.

5. For use in a washing machine of the type described having an article carrier, a spray device comprising a rectangular conduit of substantially square section forming a closed liquid flow path encircling said carrier, said conduit being provided with opposed right angle wall portions with the edge of one wall portion arranged in spaced relation from the other wall portion to form elongated longitudinally extending continuous outlet apertures in opposed relation to form slotted discharge openings for directing full, flat sheet-like water jets in the direction of the articles to be cleaned from opposite sides thereof, the slotted discharge openings of one pair of opposed wall portions of said conduits being located in the same plane, and the slotted discharge openings in the other opposed wall portions being located in a plane parallel and offset from said first named discharge openings whereby the flat full water jets produced by the discharge openings of one pair of opposed wall portions and the flat, full water jets produced by the slotted discharge openings of the other pair of opposed wall portions will extend in spaced parallel planes at right angles to one another, and a discharge spray control member for each of said longitudinally extending outlet apertures.

6. For use in a washing machine of the type described having an article carrier, a spray device comprising a pair of conduits through which water under pressure can be fed, said conduits being provided with right angle wall portions with their adjacent edges in spaced relation forming longitudinally directed elongated slotted outlet apertures positioned opposite each other for directing water jets on two sides of the articles to be cleaned, the outlet apertures of said ducts being formed by gaps between the adjacent edges of said right angle wall portions which are located in the same plane to form full sheet-like jets also in the same plane, one of said right angle wall portions forming a flow plate extending along and beyond the edge of each gap, a resilient lip connected to the other of said right angle wall portions and extending along and beyond the other edge of each gap, a flat bar pivotally mounted adjacent each of said resilient lips and extending the entire length thereof, said flat bar being provided with a relatively sharp longitudinal edge to contact the free edge portion of said lip, and an adjusting member for controling said bar to move said lip toward and away from said flow plate and control the dimensions of said slotted discharge opening between said lip and said flow directing plate.

7. For use in a washing machine of the type described having an article carrier, a rectilinear conduit of substantially square section having opposed walls having inwardly extending wall portions provided with a flanged end portion, means for supplying water under pressure to said conduit, said flange portions being arranged to terminate adjacent one of the horizontal walls of the duct to form gaps therebetween providing elongated slotted discharge openings for directing full, sheet-like water jets toward said carrier and the articles to be cleaned, the slotted discharge openings of one pair of opposed wall portions of said conduit being arranged in the same plane, the slotted discharge openings in the remaining opposed conduit wall portions being arranged in the same plane and offset from the first mentioned discharge openings vertically in another plane, the discharge openings in said last named opposed wall portions being angularly displaced 90° from the first mentioned discharge openings, a resilient lip extending along the edge of each of said flanges and projecting along said horizontal wall portion, a flat bar for each of said resilient lips extending the length thereof, said flat bar being movably supported for displacement in a direction transversely of said slotted discharge openings with one edge presented to said resilient lip, and a manually operable actuating member for moving said flat bars to control the slotted discharge openings of opposed water jets.

8. For use in a washing machine of the type described having a washing chamber and an article carrier, a rectangular conduit extending around said chamber of substantially square section, means for supplying water under pressure to said conduit, said conduit being provided with at least one pair of opposed ducts having inwardly directed wall portions terminating in a flange portion spaced from one of the horizontal walls of said conduit forming longitudinally extending slotted outlet apertures in said duct between the edge of said flange portion and horizontal wall arranged in the same plane to direct water jets of full sheet-like form toward both sides of the articles to be cleaned, the ducts of said conduits with said slotted discharge apertures of one set of opposed ducts being offset vertically from the slotted discharge apertures of the remaining pair of opposed conduits, a resilient lip member connected to each of said flanges extending the entire length of the slotted discharge apertures with its free edge portion extending forwardly across said discharge apertures with its end portion terminating adjacent one of said horizontal wall portions, a resilient lip member actuator of the same length as said resilient lip having a portion engaging said resilient lip to urge the same toward and away from said horizontal wall portion, said actuator comprising a movably mounted flat bar to move the free edge of said lip in a direction to control the water jets, and manually operable means for moving said bar about its longitudinal axis.

9. For use in a washing machine of the type described, a spray device comprising a rectilinear conduit of rectangular section having sides forming opposed duct pairs, means for supplying water under pressure to said conduit, each of said sides being provided with top and bottom wall portions, said opposed side walls terminating adjacent said top and bottom walls to form longitudinally extending gaps arranged in opposed relation to form elongated slotted outlet apertures for directing sheet-like water jets toward opposite sides of said articles from two directions at right angles one to the other, the gaps in one pair of opposed ducts being located in the same plane and the gaps in the other pair of ducts being in a plane offset vertically from the first named gaps, a resilient lip extending along one edge of each of said sides of said conduit with its free edge directed along said horizontal wall portions, a plate-like member extending along the free edge of each of said gaps, a bar movably mounted for engagement with each of said flexible lips, lever means for each of said bars, yielding spring means connecting opposed lever means to urge said bars into engagement with said flexible lips, a lever pivotally mounted between opposed ducts of said conduit having its end portion engageable with said lever means, cam portions on the ends of said pivoted lever engageable with said lever means, and a common actuating handle to rock said lever about a center pivot point to control said bars and permit the same to be operated in unison and independently.

10. For use in a washing machine of the type described having a washing chamber and article carrier, a rectangular conduit extending around said chamber, said conduit being provided with opposed side walls and horizontal walls, sets of said opposed side walls being arranged with their edges in spaced relation from the horizontal walls to provide elongated discharge slots through the gaps therebetween, certain of said opposed openings being coplanar in one direction while the remaining gaps are in an offset plane parallel with and extending at right angles to the plane of the first named gaps, means for supplying water under pressure to said conduit, flexible lips connected to said opposed side walls extending across the discharge openings and in parallel relation with said horizontal walls, a bar movably supported on said conduit having one edge portion engageable with said lip to move the same toward and away from said horizontal wall portion, a rotatable bar having its ends journaled in said sides, a projection on said bar engageable with said first named bar, lever members on said bar, yielding spring means connecting opposed pairs of said levers, an actuating bar having cam portions at the ends thereof engageable with said opposed levers and a handle for moving said bar and cam portions thereon in a direction to operate said levers simultaneously and independently.

References Cited by the Examiner

UNITED STATES PATENTS

| | | | |
|---|---|---|---|
| 768,095 | 8/04 | Twist | 239—455 |
| 1,266,167 | 5/18 | Sears | 134—151 X |
| 1,325,246 | 12/19 | Holek | 134—164 X |
| 1,627,250 | 5/27 | Parker | 239—455 |
| 2,322,417 | 6/43 | Christian | 134—148 X |
| 2,568,183 | 9/51 | Bumpus | 134—111 |
| 2,649,100 | 8/53 | Frech | 134—131 X |
| 2,665,171 | 1/54 | Stievater | 134—199 X |
| 2,708,446 | 5/55 | Phillips | 134—199 X |

FOREIGN PATENTS 665,288  9/38  Germany.

CHARLES A. WILLMUTH, *Primary Examiner.*